(12) United States Patent
Ohtsu et al.

(10) Patent No.: US 7,646,948 B2
(45) Date of Patent: Jan. 12, 2010

(54) FLEXIBLE OPTICAL WAVEGUIDE FILM, OPTICAL TRANSCEIVER MODULE, MULTI-CHANNEL OPTICAL TRANSCEIVER MODULE, AND METHOD OF MANUFACTURING FLEXIBLE OPTICAL WAVEGUIDE FILM

(75) Inventors: Shigemi Ohtsu, Kanagawa (JP); Toshihiko Suzuki, Kanagawa (JP); Akira Fujii, Kanagawa (JP); Kazutoshi Yatsuda, Kanagawa (JP); Keishi Shimizu, Kanagawa (JP); Eiichi Akutsu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/783,096

(22) Filed: Apr. 5, 2007

(65) Prior Publication Data

US 2008/0031583 A1 Feb. 7, 2008

(30) Foreign Application Priority Data

Aug. 3, 2006 (JP) .............................. 2006-212282

(51) Int. Cl.
*G02B 6/42* (2006.01)
(52) U.S. Cl. ........................................ 385/31; 359/333
(58) Field of Classification Search ................. 359/333; 385/14, 52
See application file for complete search history.

(56) References Cited

U.S. PATENT DOCUMENTS

| | | | | |
|---|---|---|---|---|
| 5,249,245 A * | 9/1993 | Lebby et al. | ................... | 385/89 |
| 5,260,822 A * | 11/1993 | Missaggia et al. | ............ | 359/337 |
| 5,327,149 A * | 7/1994 | Kuffer | ......................... | 343/720 |
| 5,387,460 A * | 2/1995 | Hirakata et al. | .......... | 428/32.63 |
| 5,629,991 A * | 5/1997 | Dragone | ....................... | 385/11 |
| 5,714,009 A * | 2/1998 | Boling | ............... | 118/723 MW |
| 5,966,478 A * | 10/1999 | Marcuse et al. | ............... | 385/14 |
| 6,208,783 B1 * | 3/2001 | Wach | .......................... | 385/43 |
| 6,497,946 B1 * | 12/2002 | Kretman et al. | .......... | 428/317.9 |
| 6,619,858 B1 * | 9/2003 | Lytel et al. | ..................... | 385/89 |
| 6,709,607 B2 * | 3/2004 | Hibbs-Brenner et al. | ...... | 216/24 |
| 6,785,447 B2 * | 8/2004 | Yoshimura et al. | ............ | 385/42 |
| 7,324,723 B2 | 1/2008 | Shioda et al. | | |
| 2002/0076147 A1 * | 6/2002 | Cush et al. | ..................... | 385/27 |
| 2002/0131670 A1 * | 9/2002 | Cush et al. | ..................... | 385/15 |
| 2003/0117691 A1 * | 6/2003 | Bi et al. | ........................ | 359/333 |
| 2004/0022499 A1 * | 2/2004 | Shimizu et al. | ................ | 385/52 |
| 2004/0026803 A1 * | 2/2004 | Shimizu et al. | ............... | 385/52 |
| 2004/0131302 A1 * | 7/2004 | Kouta et al. | ................... | 385/14 |

(Continued)

FOREIGN PATENT DOCUMENTS

JP A 10-300961 11/1998

(Continued)

*Primary Examiner*—Frank G Font
*Assistant Examiner*—Peter Radkowski
(74) *Attorney, Agent, or Firm*—Oliff & Berridge, PLC (57) ABSTRACT

A flexible optical waveguide film comprises: two waveguide cores; and a clad surrounding the two waveguide core, wherein a light entrance/exit part is disposed at one end of each of the two waveguide cores, the waveguide film having an optical path converting part comprising an air void located inside the waveguide film, and a light entrance/exit end face of the light entrance/exit part is a plane surface facing an optical path converting surface of the optical path converting part, the optical path converting surface being an interface defining the air void.

14 Claims, 4 Drawing Sheets

U.S. PATENT DOCUMENTS

| | | | |
|---|---|---|---|
| 2004/0208602 A1* | 10/2004 | Plante | 398/140 |
| 2004/0252932 A1* | 12/2004 | Shimizu et al. | 385/14 |
| 2006/0215175 A1* | 9/2006 | Yacoubian | 356/502 |
| 2006/0215715 A1* | 9/2006 | Kouta et al. | 385/14 |

FOREIGN PATENT DOCUMENTS

| | | | |
|---|---|---|---|
| JP | 11202373 A * | 7/1999 | |
| JP | A-11-248951 | 9/1999 | |
| JP | A 2000-039530 | 2/2000 | |
| JP | A 2000-235127 | 8/2000 | |
| JP | A 2002-333538 | 11/2002 | |
| JP | A 2002-365457 | 12/2002 | |
| JP | A 2003-255166 | 9/2003 | |
| JP | A 2004-029507 | 1/2004 | |
| JP | A 2004-086144 | 3/2004 | |
| JP | A 2004-109927 | 4/2004 | |
| JP | A 2005-128302 | 5/2005 | |
| JP | A 2005-202231 | 7/2005 | |

* cited by examiner

FLEXIBLE OPTICAL WAVEGUIDE FILM, OPTICAL TRANSCEIVER MODULE, MULTI-CHANNEL OPTICAL TRANSCEIVER MODULE, AND METHOD OF MANUFACTURING FLEXIBLE OPTICAL WAVEGUIDE FILM

CROSS-REFERENCE TO RELATED APPLICATIONS

This application is based on and claims priority under 35 USC 119 from Japanese Patent Application No. 2006-212282 filed Aug. 3, 2006.

BACKGROUND (i) Technical Field

The present invention relates to a flexible optical waveguide film, an optical transceiver module, a multi-channel optical transceiver module, and a method of manufacturing a flexible optical waveguide film. Particularly, the invention relates to a flexible optical waveguide film, an optical transceiver module, and a multi-channel optical transceiver module having a low profile or size and a method of manufacturing a flexible optical waveguide film which allows manufacturing steps to be simplified.

(ii) Related Art

Various methods for manufacturing a polymer optical waveguide have been proposed in the related art including, for example:

(1) a method in which films are impregnated with a monomer and in which the films are combined with the refractive index of a core part varied by selectively exposing the same (selective polymerization method);

(2) a method in which a core layer and a clad layer are applied, and a clad part is thereafter formed using reactive ion etching (RIE method);

(3) a method in which an ultraviolet curable resin provided by doping a polymeric material with a photosensitive material is exposed and developed using photolithography (direct exposure method);

(4) a method utilizing injection molding; and (5) a method in which a core layer and a clad layer are applied, and a core part is thereafter exposed to change the refractive index of the core part (photo-bleaching method).

However, the selective polymerization method of the above item (1) has a problem when films are combined. The RIE method of the above item (2) and the direct exposure method of the above item (3) result in a cost increase because a photolithographic process is used. The injection molding method of the above item (4) has a problem with the accuracy of the diameter of a core obtained by the method. The photo-bleaching method of the above item (5) has a problem in that a sufficient difference cannot be obtained between the refractive indices of a core layer and a clad layer. Although the RIE method of the above item (2) and the direct exposure method of the above item (3) may be regarded as practical methods providing high performance, they have a problem with manufacturing costs as mentioned above. Any of the manufacturing methods of the above items (1) to (5) is practically unsuitable for the formation of a polymer optical waveguide on a plastic substrate which has a great area and which is flexible.

In the field of IC techniques and LSI techniques, attention is recently paid on the implementation of optical wiring between apparatus, between boards in an apparatus, or in a chip instead of providing electrical wirings in a high density in order to achieve an improved operating speed and an improved level of integration. In particular, various proposals have been made on elements for optical wiring which utilize a surface emission laser and a photo-diode that is a surface light receiving element to take their advantage in reducing power consumption and forming a planar array.

SUMMARY

A flexible optical waveguide film comprises: two waveguide cores; and a clad surrounding the two waveguide core. A light entrance/exit part is disposed at one end of each of the two waveguide cores, the waveguide film having an optical path converting part comprising an air void located inside the waveguide film. A light entrance/exit end face of the light entrance/exit part is a plane surface facing an optical path converting surface of the optical path converting part, the optical path converting surface being an interface defining the air void.

DETAILED DESCRIPTION

Exemplary embodiments of the invention will now be specifically described based on the accompanying drawings.

First Exemplary Embodiment of the Invention (Configuration of Polymer Optical Waveguide Film)

Figure 1:
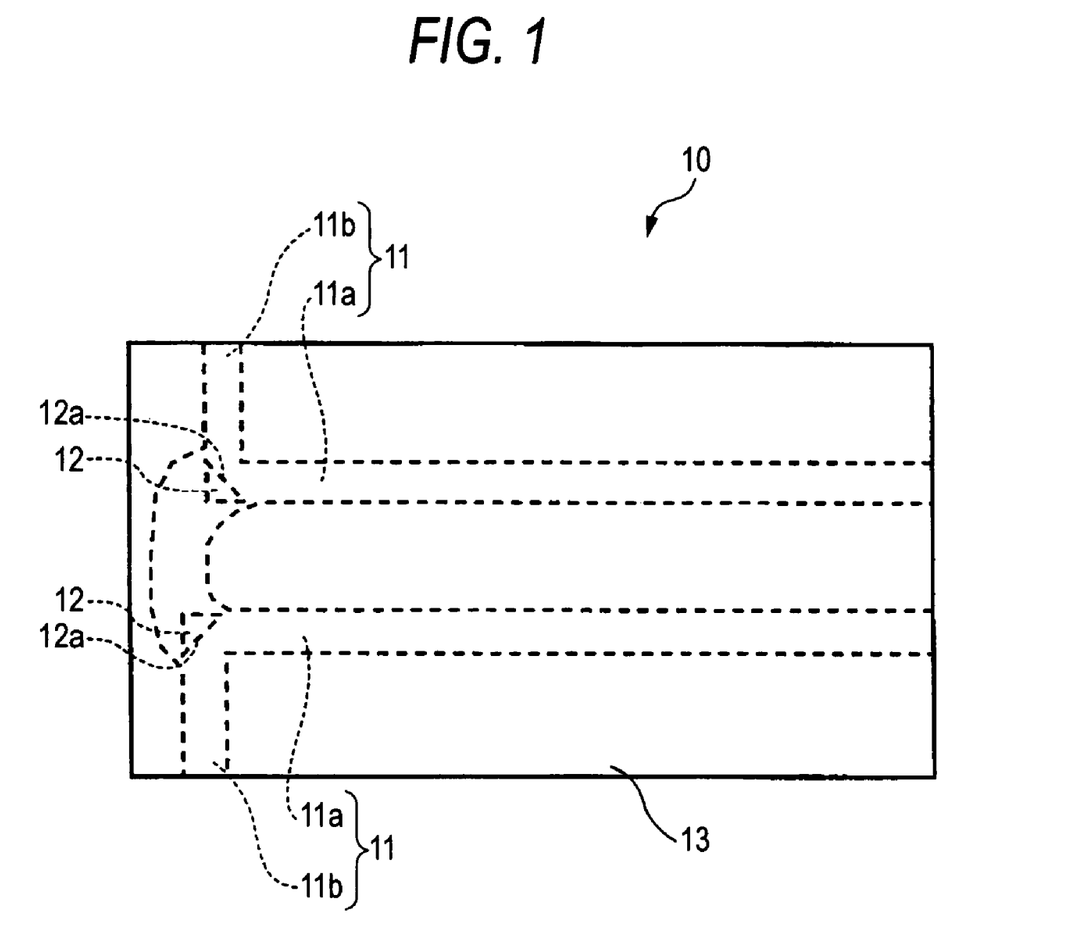
FIG. 1 is a plan view of a polymer optical waveguide film representing a first exemplary embodiment of the invention schematically showing an example of a configuration of the same.

FIG. 1 is a plan view of a polymer optical waveguide film representing a first exemplary embodiment of the invention schematically showing an example of a configuration of the same.

In FIG. 1, reference numeral 10 represents a polymer optical waveguide film. Referring to the basic configuration of the polymer optical waveguide film 10, as shown in FIG. 1, it is constituted by a planar flexible optical waveguide film having two waveguide cores 11, 11 and a clad 13 surrounding the periphery of the two waveguide cores 11. In the illustrated example, the polymer optical waveguide film 10 includes the two waveguide cores 11, 11 constituted by a pair of first cores 11a, 11a extending the lengthwise direction of the film and a pair of second cores 11b, 11b extending orthogonally to the first cores 11a toward widthwise end faces of the film that are opposite to each other, optical path converting parts 12 which are provided at intersections between the first cores 11a and second cores 11b and at which the first cores 11a and the second cores 11b are optically coupled, and a clad 13 surrounding the cores 11a, 11b and the optical path converting parts 12.

In the illustrated example, the intersections of the two waveguide cores 11 are connected with each other, and the pair of second cores 11b is formed such that they are not located on the same straight line, although they are formed in parallel with each other. The pair of second cores 11b is formed as a light entrance part and a light exit part, and there is a pair of optical path converting parts 12, 12 in a core layer including either of the cores. An optical path converting part 12 is constituted by an air void which is in the form of a right-angled triangle when viewed from above. One optical path converting surface 12a including the hypotenuse forming part of a surface defining the periphery of the air void constitutes a 90 deg folding mirror surface which bends folds the optical axis of the waveguide at 90 deg. Each of light entrance/exit end faces of the light entrance/exit parts constituted by the second cores 11b (end faces in the widthwise direction of the film) is provided on a plane of the clad 13 so as to face the optical path converting surface 12a of an optical path converting part 12. The waveguide cores 11 are made of a material having a great refractive index. The waveguide cores 11 have a substantially rectangular section when viewed in the traveling direction of light.

In the polymer optical waveguide film 10 representing the first exemplary embodiment of the invention, air voids to serve as the optical path converting parts 12 can be formed in the second cores 11b provided at one end of each of the two waveguide cores 11, and each of the light entrance/exit end faces of the second cores 11b can be provided in the form of planes facing toward an optical path converting surfaces 12a forming part of a surface defining the periphery of an air void. The configuration makes it possible to fabricate a minimum-sized polymer optical waveguide film 10 in the form of a flexible belt which has the property of following up deformation such as bending or twisting. Since the optical path converting parts 12 can be formed inside the second cores 11b, there is no particular need for measures to protect the mirror surfaces of the optical path converting parts 12. It is therefore possible to use transparent and highly reliable sealing materials which are commonly used for semiconductors.

Second Exemplary Embodiment of the Invention (Configuration of Polymer Optical Waveguide Film)

Figure 2:
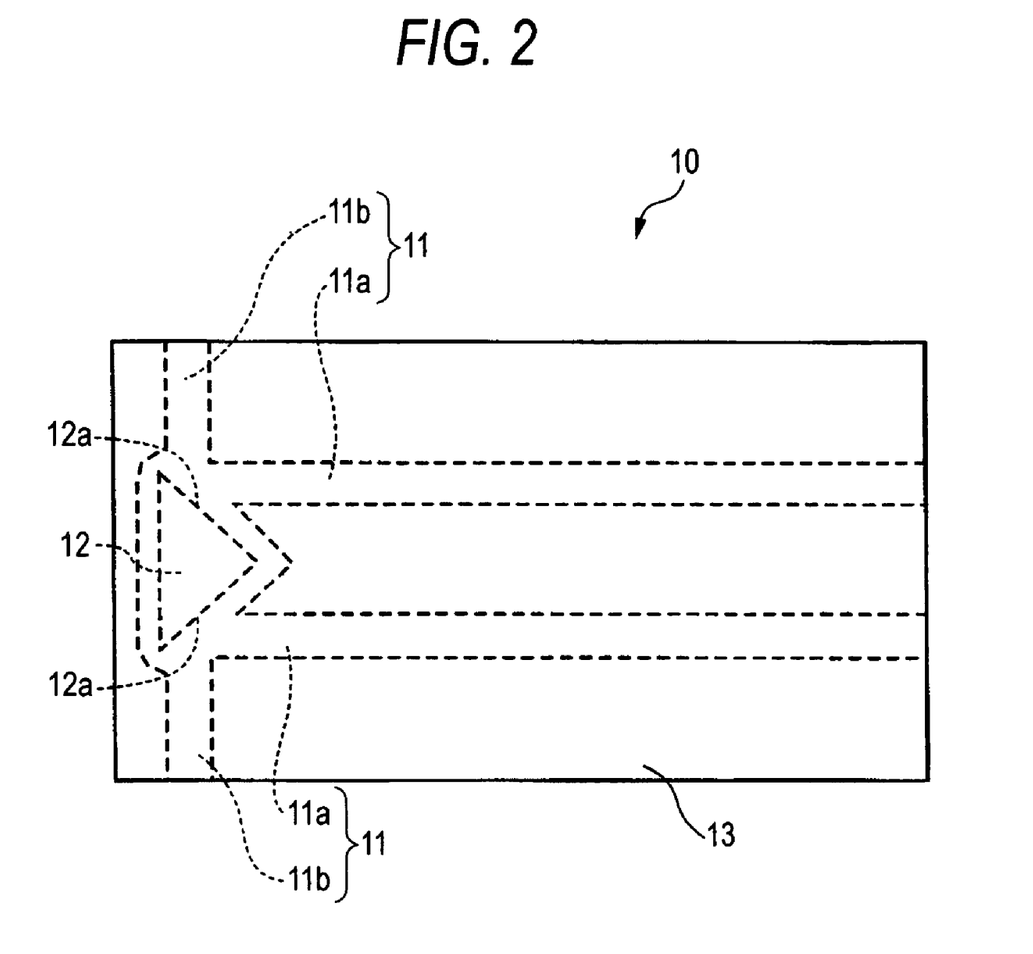
FIG. 2 is a plan view of a polymer optical waveguide film representing a second exemplary embodiment of the invention schematically showing an example of a configuration of the same.

FIG. 2 is a plan view of a polymer optical waveguide film in a second exemplary embodiment of the invention schematically showing an example of a configuration of the same. In the same figure, members substantially identical to those in the first exemplary embodiment of the invention are indicated by like member names and reference numerals. Therefore, detailed description will be omitted for such members.

FIG. 2 is significantly different from the first exemplary embodiment of the invention in that the second cores 11b extending toward the end faces in the widthwise direction of the film from one end of the respective first cores 11a are formed on the same straight line and in that a single optical path converting part 12 is formed in a position corresponding to the connecting part which connects the intersections between the first and second cores 11a and 11b.

The polymer optical waveguide film 10 in the second exemplary embodiment of the invention is similar to the polymer optical waveguide film 10 of the first exemplary embodiment of the invention in that an air void to serve as the optical path converting part 12 can be formed inside the second cores 11b disposed at one end of each of the two waveguide cores 11 and in that each of light entrance/exit end faces of the second cores 11b can be provided in the form of a plane facing toward the optical path converting surface 12a which forms part of a surface defining the periphery of the air void.

The optical path converting part 12 constituted by an air void of the polymer optical waveguide film 10 in the second exemplary embodiment of the invention is also disposed in a light entrance part and a light exit part constituted by the pair of second cores 11b. The light entrance/exit end faces of the pair of second cores 11b are provided on planes of the clad 13 so as to face the optical path converting part 12 forming part of the surface defining the periphery of the air void. The air void is in the form of a right-angled triangle when viewed from above, and two optical path converting surfaces 12a, 12a including the right-angled corner constitute a 90 deg folding mirror surface which folds the optical axis of the waveguide at 90 deg.

The optical path converting parts 12 in the first and second exemplary embodiments of the invention are provided at one end of each of the two waveguide cores 11, but the invention is not limited to such a disposition. For example, the optical path converting parts 12 may be symmetrically provided at both ends of each of the two waveguide cores 11, and they may alternatively be formed midway the ends of the first cores 11a.

The polymer optical waveguide films 10 in the first and second exemplary embodiments of the invention having the above-described configurations can be efficiently manufactured as described below using a manufacturing method according to the invention. The following example of manufacture applies to a case in which optical path converting parts 12 constituted by two air voids are formed in positions associated with intersections between first and second cores 11a and 11b just as done in the polymer optical waveguide film 10 shown in FIG. 1 and to a case in which an optical path converting part 12 constituted by a single air void is formed in a position associated with intersections between first and second cores 11a and 11b just as done in the polymer optical waveguide film 10 shown in FIG. 2. Obviously, the example of manufacture applies to a case in which an optical path converting part 12 is fabricated at one end of each of two waveguide cores 11 and to a case in which optical path converting parts 12 are fabricated at both ends of each of two waveguide cores 11.

A polymer optical waveguide film 10 can be fabricated, for example, through steps (1) to (7) described below.

(1) a step of preparing a mold having a concave part constituted by a layer obtained by curing a curable resin for mold formation and corresponding to two convex parts to serve as optical waveguide cores and having two or more through holes for introducing and discharging the resin in communication with one and another end of the concave part, respectively (2) a step of bonding a flexible film substrate for a bottom clad (hereinafter referred to as a bottom clad film substrate) with the mold, the substrate having preferable adhesion to the mold (3) a step of dispensing the curable resin for core formation into the through hole at one end of the concave part of the mold having the flexible film substrate for the bottom clad bonded thereon and performing pressure-reducing evacuation at the through hole on the other end of the concave part of the mold to fill the concave part of the mold with the curable resin for core formation (4) a step of curing the curable resin for core formation thus filled and releasing the mold from the flexible film substrate for the bottom clad (5) a step of combining a film substrate for a top clad with the flexible film substrate for the bottom clad on which a waveguide core part and a mirror part have been formed using a curable resin for cladding (6) a step of curing the layer of the curable resin for cladding (7) a step of performing dicing to cut an end of the polymer optical waveguide film Each of the above-described steps (1) to (7) for fabricating a polymer optical waveguide film will now be described in detail. Although it is preferable to fabricate the mold using a master on which convex parts corresponding to waveguide cores are formed, the invention is not limited to this. The following description of the manufacturing method will address steps for fabricating a polymer optical waveguide film using a master mold.

(Fabrication of Master)

Fabrication techniques according to the related art such as those utilizing photolithography may be used without any particular limit to fabricate a master formed with convex parts corresponding to the shape of waveguide cores and concave parts corresponding to mirror parts provided using air voids midway the convex parts. A master may alternatively be fabricated using a method of fabricating a polymer optical waveguide using an electro-deposition process or a photo-electrical deposition process which has already been proposed by the applicant (as in JP-A-2002-333538 or JP-A-2005-202231, for example). The size of the convex parts corresponding to the waveguide cores formed on the master is appropriately determined depending on the usage of the polymer optical waveguide. By way of example, it is common to use a core of about 10 μm square in a single mode polymer optical waveguide and a core of about 50 to 100 μm square in a multi-mode polymer optical waveguide. In some applications, however, optical waveguides having a greater core section on the order of several hundred μm are used.

(Fabrication of Mold)

As an exemplary method of mold fabrication is as follows. A layer of a curable resin for mold formation is formed on a convex part forming surface of a master fabricated as described above by applying or casting the curable resin for mold formation, and a drying process is performed as occasion demands to cure the curable resin. Thereafter, the curable resin layer thus cured is released from the master to obtain a mold which is formed with concave parts corresponding to the shape of convex parts to serve as waveguide cores and which is formed with convex parts corresponding to mirror parts provided using air voids midway the concave parts. Through holes for introducing and discharging a curable resin for core formation are formed in communication to one and another end of the concave parts. For example, the through holes may be formed by punching the mold in a predetermined shape. There is no risk of invasion of the curable resin for core formation into regions other than the concave parts of the mold even in the case of punched through holes because there is high adhesion between the mold and the film substrate for the bottom clad and no gap is therefore formed between the mold and the film substrate for the bottom clad except in the regions of the concave parts.

The thickness of the mold (cured resin layer) is appropriately determined in consideration to the ease of handling of the mold. In general, a proper thickness is in the range from about 0.1 mm to about 50 mm. It is desirable to perform a releasing process on the master such as application of a release agent in advance to promote the releasing of the master from the mold.

The through hole provided on the side where the curable resin for core formation is introduced serves as a liquid (curable resin for core formation) reservoir. There is no particular limitation on the shape and size of the through hole on the curable resin introducing side as long as the through hole is in communication with the curable resin introducing ends of the concave parts and serves as a liquid reservoir. The through hole provided on the side where the curable resin for core formation is discharged is used for evacuation for reducing the pressure in the concave parts to fill the concave parts of the mold with the resin. There is no particular limitation on the shape and size of the through hole on the curable resin discharging side as long as the hole is in communication with the curable resin discharging ends of the concave parts of the mold such that it can be used for evacuation.

The through hole provided on the side of the concave parts of the mold where the curable resin for core formation is introduced serves as a liquid reservoir as described above. Therefore, when the through hole is formed with a section which is tapered from a side of the same that is contiguous with the film substrate used as the clad, the mold and the film substrate for the bottom clad can be easily released from each other after filling the concave parts of the mold with the curable resin for core formation and curing the resin while the mold is bonded with the film substrate for the bottom clad. It is not required to adopt such a sectional structure for the through hole on the side where the curable region for core formation is discharged because the hole is not required to have the function of a liquid reservoir.

As another example of the fabrication of the mold, the master may be provided with not only the concave parts corresponding to the shape of waveguide cores but also convex parts corresponding to the shape of the through holes for introducing and discharging the curable resin for core formation (the height of the convex parts is greater than the thickness of the layer obtained by curing the curable resin for mold formation). A possible method for fabricating the convex parts corresponding to the shape of the through holes provided on the master is as follows. The curable resin layer is formed using a coating or casting process such that the convex parts penetrate through the curable resin layer for mold formation. The curable resin layer is then cured and is thereafter released from the master.

It is preferable that a curable resin for mold formation used to fabricate the mold can be easily released from the master; the resultant mold has mechanical strength and dimensional stability of a certain degree or higher such that the mold can be used repeatedly and has stiffness (hardness) sufficient to maintain the shape of the concave parts; and there is a high level of adhesion between the mold and the film substrate for the bottom clad. Various additives may be added to the curable resin for mold formation as occasion demands.

The curable resin for mold formation may be applied to or cast on the surface of the master, and it preferably has viscosity equal to or lower than a certain limit, e.g., in the range from about 500 to about 7000 mPa·s because the convex part corresponding to each waveguide core formed on the master must be accurately duplicated. For example, curable resins for mold formation to be used according to the invention include those which become rubbery bodies exhibiting elasticity after being cured. A solvent may be added to adjust viscosity to such an extent that the solvent will not have adverse effect.

From the viewpoint of releasability, mechanical strength, dimensional stability, hardness, and adhesion to the substrate for the clad as described above, it is preferable to use a curable organopolysiloxane which becomes silicone rubber (silicone elastomer) or silicone resin when cured. The curable organopolysiloxane preferably includes a methylsiloxane group, an ethylsiloxane group, and a phenylsiloxane group in its molecule. The curable organopolysiloxane may be either single liquid type or two-liquid type which is used in combination with a stiffener. The resin may be either heat curable type or room temperature curable type (e.g., a resin which is cured by moisture in the air) and it may be cured using other methods (such as UV curing).

The curable organopolysiloxane preferably becomes silicone rubber when cured. For this reason, a material referred to as liquid silicone rubber is normally used (the term "liquid" implies materials having high viscosity such as a pasty material), and a two-liquid type material to be used in combination with a stiffener is preferred. Above all, additive types of liquid silicone rubber are preferred because they stiffen in a short time uniformly in both of surface and internal regions thereof without by-products and have high releasability and a low rate of contraction.

Among liquid silicone rubbers, liquid dimethylsiloxane rubber is especially preferred in terms of adhesion, releasability, strength, and hardness. In general, a material obtained by curing liquid dimethylsiloxane rubber has a refractive index as low as about 1.43, and a mold fabricated from such a material can be preferably used as a clad layer as it is without releasing it from the film substrate for the bottom clad. In this case, measures must be taken to prevent the mold from coming off the core forming resin that fills the core and the film substrate for the bottom clad.

The viscosity of the liquid silicone rubber is preferably in the range from about 500 to about 7000 Pa·s and, more preferably, in the range from about 2000 to about 5000 Pa·s to accurately duplicate the convex parts corresponding to the waveguide cores, to facilitate defoaming by suppressing inclusion of air bubbles, and to form a mold having a thickness of a few millimeters.

The surface energy of the mold is preferably in the range from 10 dyn/cm to 30 dyn/cm and, more preferably, in the range from 15 dyn/cm to 24 dyn/cm from the viewpoint of adhesion between the mold and the substrate film. The Shore rubber hardness of the mold is preferably in the range from 15 to 80 and, more preferably, in the range from 20 to 60 from the viewpoint of molding performance, the maintenance of the concave shape, and releasability. The surface roughness (average roughness Ra) of the mold is preferably 0.2 μm or less and, more preferably, 0.1 μm or less from the viewpoint of molding performance.

The mold is preferably optically transmissive in the ultraviolet region and/or visible region. It is preferable that the mold is optically transmissive in the visible region for the following reasons. The mold can be easily positioned when it is bonded with the film substrate for the bottom clad at the above described step (2). At the above-described step (3) for filling the concave parts of the mold with the curable resin for core formation, the process of filling the concave parts of the mold with the curable resin for core formation can be observed, and the completion of the filling process can therefore be easily confirmed. It is preferable that the mold is optically transmissive in the ultraviolet region because the curable resin for core formation is to be ultraviolet-cured through the mold when an ultraviolet curable resin is used, and the mold preferably has a transmittance of 80% or more in the ultraviolet region (250 nm to 400 nm).

Among curable organopolysiloxanes, liquid silicone rubber which becomes silicone rubber when cured is excellent in the contradictory properties of adhering and coming off to and from the film substrate for the bottom clad, and it is capable of duplicating nano-structures and preventing a liquid from entering when made to tightly adhere to the film substrate for the bottom clad. Since the mold utilizing such silicone rubber duplicates the master accurately and tightly adheres to the film substrate for the bottom clad, only concave parts between the mold and the film substrate for the bottom clad can be efficiently filled with the resin for core formation, and the film substrate for core formation can be easily released from the mold. Therefore, a polymer optical waveguide can be quite easily fabricated using the mold with the shape of the waveguide maintained accurately.

A description will now be made on the step of bonding the mold with the film substrate for the bottom clad having high adhesion to the mold.

An optical element fabricated from the polymer optical waveguide can be used for various levels of optical wiring. Therefore, the flexible film substrate for the bottom clad is chosen according to, for example, the usage of the optical element taking optical characteristics such as refractivity and optical transmittance, mechanical strength, heat resistance, adhesion to the mold, and flexibility into consideration. For example, the flexible film for the bottom clad may be an alicyclic acrylic resin film, alicyclic olefin resin film, cellulose triacetate film, or fluorine-containing resin film. The refractive index of the flexible film substrate for the bottom clad is preferably smaller than 1.55 and, more preferably smaller than 1.53 in order to maintain a certain refractive index difference between the substrate and the waveguide core.

Alicyclic acrylic resin films that can be used include, for example, products designated as OZ-1000 or OZ-1100 (manufactured by Hitachi Chemical Co., Ltd.) in which an aliphatic cyclic hydrocarbon such as tricyclodecane is introduced as an ester substituent.

The alicyclic olefin resin film may be a product having a norbornene structure as a principal chain thereof or a product having a norbornene structure as a principal chain and having a polar group such as an alkyloxycarbonyl group (or an alkyl group with 1 to 6 carbon atoms or cycloalkyl group) as a side chain. Among such films, an alicyclic olefin resin having a norbornene structure as a principal chain and a polar group such as an alkyloxycarbonyl group as a side chain has excellent optical characteristics including a low refractive index (the refractive index is approximately 1.50 at which a proper refractive index difference can be maintained between the core and the clad) and high optical transmittance, and it is excellent in adhesion to a mold and in heat resistance. The material is therefore especially suitable for the fabrication of a polymer optical waveguide film.

The thickness of the flexible film substrate for the bottom clad is appropriately chosen in consideration to the flexibility, rigidity, and ease of handling. In general, the thickness is preferably in the range from about 0.02 mm to about 0.2 mm.

A description will now be made on the step of dispensing the curable resin for core formation into the through hole at one end of the concave part of the mold having the flexible film substrate for the bottom clad bonded thereon and performing pressure-reducing evacuation at the through hole on the other end of the concave part of the mold to fill the concave part of the mold with the curable resin for core formation.

At this step, the through hole provided on the resin entrance side is filled with the curable resin for core formation, and pressure-reducing evacuation is performed at the through hole provided on the resin discharging side, which allows the concave part of the mold formed between the mold and the flexible film substrate for the bottom clad to be filled with the resin. The pressure-reducing evacuation improves the adhesion between the mold and the flexible film substrate for the bottom clad and makes it possible to prevent the inclusion of air bubbles. For example, the pressure-reducing evacuation may be performed by inserting a suction pipe into the through hole provided on the discharging side and connecting the suction pipe with a suction pump.

For example, resins such as radiation curable, electron beam curable, and heat curable resins may be used as the curable resin for core formation. Among such resins, UV curable resins and heat curable resins are preferably used. For example, a UV curable or heat curable monomer or oligomer or a mixture of the monomer and oligomer may be preferably used as a UV curable resin or heat curable resin for core formation. For example, an epoxy type, polyimide type, or acryl type UV curable resin is preferably used as a UV curable resin.

Since the curable resin for core formation fills the concave part of the mold formed between the more and the flexible film substrate for the bottom clad as a result of capillarity, the curable resin used for forming the core must have low viscosity. Therefore, the viscosity of the curable resin is preferably in the range from 10 to 2000 mPa·s, more preferably in the range from 20 to 1000 mPa·s, and still more preferably in the range from 30 to 500 mPa·s.

In order that the original shape of the convex part corresponding to the waveguide core formed on the master will be accurately reproduced, a change in the volume of the curable resin for core formation at the time of curing of the same must be small. The curable resin for forming the core may become a source of waveguide loss, for example, when the volume of the same decreases. It is therefore desirable that a change in the volume of the curable resin for forming the core is as small as possible. Specifically, the volume change is preferably 10% or less and, more preferably, 6% or less. It is preferable to avoid the use of a solvent to reduce the viscosity of the resin as long as occasion allows because it results in a greater change in the volume of the resin when it is cured.

A polymer may be added to the curable resin for forming the core in order to suppress the change (contraction) of the volume of the resin when it is cured. Preferably, the polymer has compatibility with the curable resin for forming the core and does not have adverse effect on the refractive index, elastic modulus, and the transmittance characteristics of the curable resin for forming the core. The addition of the polymer makes it possible to suppress the change in the volume of the resin and also makes it possible to control the viscosity and glass transition point of the curable resin. For example, an acryl type, methacrylic acid type, or epoxy type polymer is used, but the invention is not limited to them.

The refractive index of the curable resin for forming the core after it is cured must be greater than that of the film substrate for the bottom clad (and the film substrate for the top clad at the above-described step (5)). The refractive index is 1.50 or more and, preferably, 1.53 or more. There is a refractive index difference of 0.01 more and, preferably, 0.03 or more between the film substrate for the bottom clad (and the film substrate for the top clad at the above-described step (5)) and the waveguide core.

A description will now be made on the step of curing the curable resin for core formation thus filled and releasing the mold from the flexible film substrate for the bottom clad.

This step cures the curable resin for forming the core with which the mold is filled. When a UV curable resin is used, the resin may be cured using, for example, an ultraviolet lamp, ultraviolet LED, or UV irradiation apparatus. When a heat curable resin is used, the resin may be cured, for example, by heating it in an oven.

A description will now be made on the step of combining a film substrate for a top clad with the flexible film substrate for the bottom clad on which the waveguide core part and the mirror part have been formed using a curable resin for cladding.

A film substrate for a top clad is used to form a sealed air void mirror on the flexible film substrate for the bottom clad having a core formed therein. The film substrates for cladding may be combined in a low-pressure atmosphere using a curable resin for cladding. At this time, the bonding agent preferably has a refractive index that is close to the refractive index of the films for cladding. Referring to the bonding agent used, for example, an ultraviolet curable resin or heat curable resin is preferably used. For example, it is advantageous to use an ultraviolet curable or heat curable monomer or oligomer or a mixture of the monomer and the oligomer.

A description will now be made on the step of curing the layer of the curable resin for cladding.

The curable resin for cladding may be cured using the same method and process as the above-described step (4).

A description will now be made on the step of performing dicing to cut ends of the polymer optical waveguide film.

Finally, the polymer optical waveguide film is diced to cut ends of the same, and a polymer optical waveguide film having a desired outline can be obtained. The polymer optical waveguide film can be used as a waveguide film for two-way communication by connecting a light emitting element and a light receiving element to cut end faces in the longitudinal direction thereof.

A structure of the waveguide film for two-way communication will be described below.

Third Exemplary Embodiment of the Invention (Configuration of Transceiver Module for Two-Way Communication]

Figure 3:
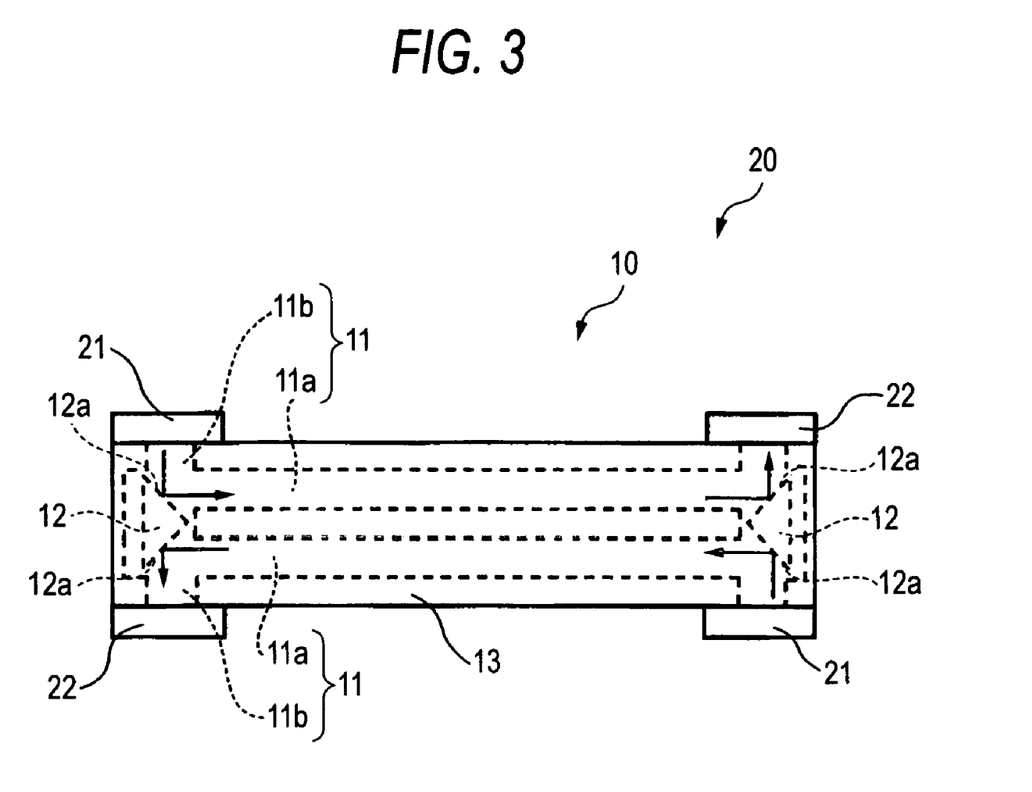
FIG. 3 is a plan view of a transceiver module for two-way communication representing a third exemplary embodiment of the invention schematically showing an example of a configuration of the same.

FIG. 3 is a plan view of a transceiver module representing a third exemplary embodiment of the invention schematically showing an example of a configuration of the same. In FIG. 3, members substantially identical to members in the first and second exemplary embodiments of the invention are indicated by like member designations and reference numerals. Therefore, detailed description will be omitted for those members.

In FIG. 3, reference numeral 20 represents a transceiver module for two-way communication. Referring to a basic configuration of the transceiver module, as shown in FIG. 3, the module includes two waveguide cores 11, 11 having air voids constituting optical path converting parts 12 at both ends of a polymer optical waveguide film 10 formed by constituent members substantially identical to those in the second exemplary embodiment of the invention and light emitting elements 21 and light receiving elements 22 which are directly connected to light entrance/exit end faces (end faces in the widthwise direction of the film) of light entrance/exit parts constituted by second cores 11b, respectively. The transceiver module 20 for two-way communication can be used with the light emitting elements 21 and the light receiving elements 22 directly joined to upper and lower end faces in the widthwise direction of the film.

The polymer optical waveguide film 10 is characterized in that it is configured such that it can be rotated at 90 deg to be used in an upright state after ends of the polymer optical waveguide film 10 are cut into a predetermined outline. As a result, the light emitting elements 21 and the light receiving elements 22 can be bonded and secured so as to constitute planes facing air voids that are optical path converting parts 12 formed in the second cores 11b, optical path converting surfaces 12a of the optical path converting parts 12, and light entrance/exit end faces of the second cores 11b. The light emitting and receiving elements 21 and 22 are connected by bonding the light emitting elements 21 (or the light receiving elements 22), the waveguide film 10, and the light receiving elements 22 (or the light emitting elements 21) in the order listed, and the transceiver module 20 for two-way communication can be thus formed. The light emitting and receiving elements 21 and 22 are preferably secured using the same resin from which the waveguide core 11 is formed.

(Operation of Transceiver Module for Two-Way Communication)

As shown in FIG. 3, an optical signal emitted by a light emitting element 21 enters a second core 11b through the light entrance/exit end face of the second core 11b. The incident optical signal is reflected by the optical path converting surface 12a of an optical path converting part 12 to propagate in a first core 11a. The optical signal is reflected again by the optical path converting surface 12a of another optical path converting part 12, and the signal thus changes its propagating direction to impinge on the a light receiving element 22 through the second core 11b. The optical signal is converted into an electrical signal which is thereafter transmitted to the outside through an electronic component which is not shown. Thus, the light emitting and receiving elements 21 and 22 can be optically coupled with respective light entrance/exit end faces of the second cores 11b, . . . , 11b on both of top and bottom sides of the polymer optical waveguide film 10 to obtain a transceiver module 20 for two-way communication.

Fourth Exemplary Embodiment of the Invention (Configuration of Multi-Channel Transceiver Module)

Figure 4A:
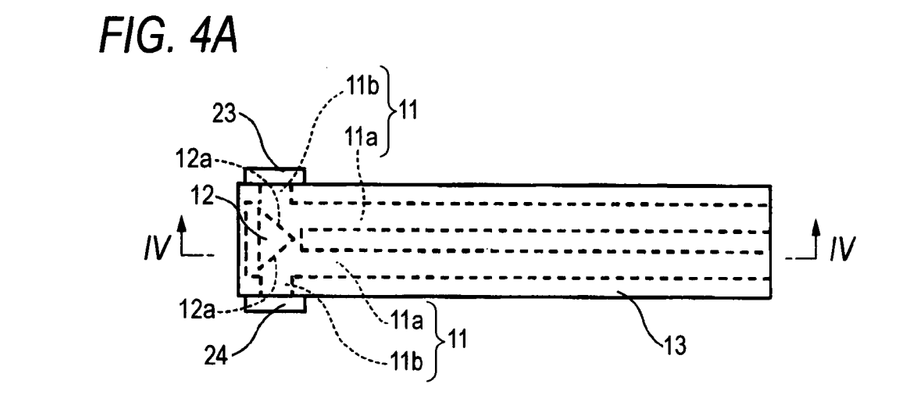
FIGS. 4A, 4B, and 4C schematically show an example of a configuration of a multi-channel transceiver module representing a fourth exemplary embodiment of the invention.
Figure 4B:
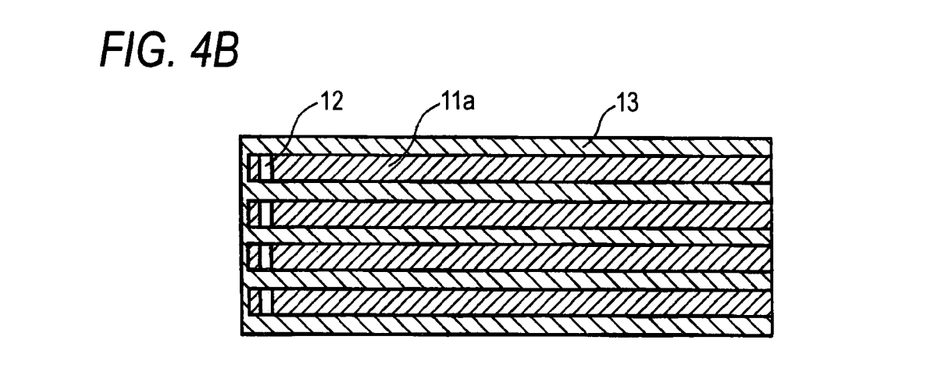
Figure 4C:
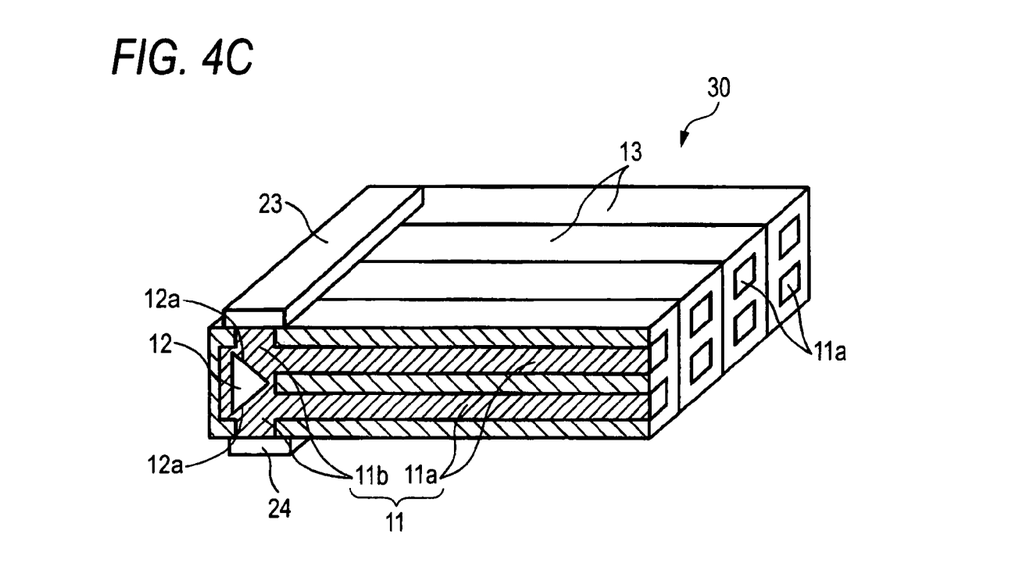

FIGS. 4A, 4B, and 4C schematically show an example of a configuration of a multi-channel transceiver module representing a fourth exemplary embodiment of the invention. FIG. 4A is a plan view of the multi-channel transceiver module. FIG. 4B is a sectional view taken along the line IV-IV in FIG. 4A. FIG. 4C is a perspective view partially in cross section of the multi-channel transceiver module. In those figures, members substantially identical to members in the first and second exemplary embodiments of the invention are indicated by like member designations and reference numbers.

In FIGS. 4A, 4B, and 4C, reference numeral 30 represents a multi-channel transceiver module. Referring to the basic configuration of the multi-channel transceiver module 30, as shown in FIGS. 4A, 4B, and 4C, four waveguide films 10 for two-way communication in the second exemplary embodiment of the invention are combined and stacked such that the light entrance/exit surfaces of the second cores 11b of the waveguide films 10 for two-way communication face upward and downward, respectively, which allows the vertical two wave guide cores 11, 11 to be laterally disposed in parallel with each other into a planar configuration. A light emitting element array 23 serving as an optical transmission part and a light receiving element array 24 serving as an optical reception part are directly bonded to light entrance/exit end faces (end faces in the width direction of the films) constituted by the second cores 11b, respectively. For example, a VCSEL element array may be preferably used as the light emitting element array 23, and a photo-diode array may be preferably used as the light receiving element array 24. Thus, a multi-channel transceiver module 30 for two-way communication having a predetermined number of channels can be obtained.

The multi-channel transceiver module 30 for two-way communication representing the fourth exemplary embodiment of the invention can be three-dimensionally configured by bonding and securing the light emitting element array 23 and the light receiving element array 24 such that they constitute planes which face air void mirrors disposed at one end of the belt-like polymer optical waveguide films 10 having two waveguide cores 11 formed therein and which face light entrance/exit end faces of the second cores 11b, just as in the third exemplary embodiment of the invention. Since the size of the optical waveguide can be made small size in the direction of the thickness thereof, which allows the module to be provided with a small profile and small size. The flexible of wiring can be also increased.

The exemplary embodiments the invention will now be more specifically described by referring to several examples of the invention.

Example 1

Fabrication of Polymer Optical Waveguide Film

A thick resist (SU-8 manufactured by Micro Chemical K.K.) is applied to a Si substrate using a spin coat process, pre-baked at 80° C. thereafter, and exposed and developed through a photo-mask. Thus, a two core-pattern having convex parts corresponding to waveguide cores having a square sectional shape as shown in FIG. 4C and air voids corresponding to the shape of a spatial clad midway the convex parts is formed. Next, the pattern is subjected to post-baking at 120° C. to fabricate a master for fabricating a polymer optical waveguide core.

A thick resist (SU-8 manufactured by Micro Chemical K.K.) is applied to a Si substrate using a spin coat process in the same way as the fabrication of the master. The resist is pre-baked thereafter and exposed and developed through a photo-mask to form a clad pattern having a convex part with a square sectional shape as shown in FIG. 4C. Next, the pattern is post-baked at 120° C. to fabricate a master for fabricating a polymer optical waveguide clad.

Next, a release agent is applied to each of the master for core fabrication and the master for clad fabrication, and a mixture of a heat curable liquid dimethylsiloxane rubber (SYLGARD184 having viscosity of 5000 mPa·s manufactured by DOW CORNING ASIA LTD.) and a stiffener is dispensed to those masters. The mixture is heated at 120° C. for 30 minutes to be cured and then released from the masters to fabricate a mold for forming a core having concave parts corresponding to concave parts having a rectangular sectional shape of wave guide cores and a mold for forming a clad (the thickness of the molds is 5 mm).

Each of the mold for core formation and the mold for clad formation is fabricated by forming through holes for introducing and discharging a curable resin for core formation having a circular shape when viewed from above and a tapered sectional shape in the direction of the thickness of the mold, the through holes being formed by punching the mold so as to be in communication with one and another end of the concave parts of the mold, respectively.

Next, the mold for core formation thus fabricated is bonded with a film substrate for a clad (ARTON film manufactured by JSR Corporation having a refractive index of 1.510) having a thickness of 50 μm that is a size greater than the thickness of the mold. A few droplets of an ultraviolet curable resin having viscosity of 500 mPa·s are dispensed to the through holes on the resin introducing side of the mold, and pressure-reducing evacuation is performed at the through holes on the resin discharging side (pressure-reducing evacuation side). Then, the concave parts of the mold are filled with the ultraviolet curable resin in 10 minutes. Next, the rein is ultraviolet-cured by irradiating it with UV light of 50 mW/cm$^2$ from above the mold for 5 minutes. When the core forming mold is released from the ARTON film, cores having the same shape as the convex parts of the master for core fabrication had been formed on the ARTON film.

Then, the clad forming mold and the ARTON film having cores formed thereon are bonded with each other. A few droplets of the ultraviolet curable resin having viscosity of 500 mPa·s are dispensed to the through holes on the resin introducing side of the mold, and pressure-reducing evacuation is performed at the through holes on the resin discharging side (pressure-reducing evacuation side). Then, a concave part constituting a clad forming region around the core is filled with the ultraviolet curable resin. Next, therein is ultraviolet-cured by irradiating it with UV light of 50 mW/cm$^2$ from above the mold for 5 minutes. When the clad forming mold is released from the ARTON film, cores and a clad had been formed on the ARTON film with predetermined air voids between them.

Next, an ultraviolet curable resin is applied to the ARTON film, the resin had the same refractive index of 1.51 as the ARTON film when it is cured. Thereafter, the film is combined with another film having cores and a clad fabricated in advance under a low pressure, and the resin is ultraviolet-cured by irradiating it with UV light of 50 mW/cm$^2$ for 5 minutes. Thus, a polymer optical waveguide film having 90 deg folding mirrors is obtained.

Then, ends of the polymer optical waveguide film are cut using a dicing saw to obtain a two-way polymer optical waveguide film having predetermined folding mirrors.

(Fabrication of Sub-Mount)

An RIE process is conducted to form a sub-mount, having a thickness of 450 μm, made of silicon having recesses for mounting light emitting and receiving elements and a recess for mounting the waveguide.

(Mounting of Light Emitting Element)

A VCSEL element is then mounted in a recess of the sub-mount thus fabricated using a flip-chip bonder.

(Mounting of Waveguide Film)

Next, after positioning both ends of the polymer optical waveguide film in the width direction of the same, the film is placed on a predetermined mount surface of the Si sub-mount using the flip-chip bonder so as to align a light emitting surface of the VCSEL element with an end face of the waveguide core and is secured to the sub-mount using the ultraviolet curable resin for the core.

(Mounting of Light Receiving Element)

Then, another end face of the polymer optical waveguide core on the sub-mount and a light receiving surface of a back side reception type photo-diode element are bonded using the flip-chip bonder.

Next, electrodes of the VCSEL element and the back side reception type photo-diode element are connected to package electrodes using wire bonding. Further, an IC sealing resin is dispensed to seal each wire with the resin. Thus, the VCSEL element and the photo-diode element are electrically connected to predetermined electrode pads to obtain a two-way optical transceiver module having a pair of light transmitting and receiving parts and a polymer optical waveguide film.

Example 2

Fabrication of Polymer Optical Waveguide Film

A polymer optical waveguide film having folding mirrors is fabricated in the same manner as in Example 1, and the film is thereafter combined with other polymer waveguides having folding mirrors to fabricate a multi-channel two-way waveguide film having predetermined folding mirrors.

(Fabrication of Sub-Mount)

A sub-mount made of Si is fabricated using the same fabrication method as in Example 1.

(Mounting of Light Emitting Elements)

A VCSEL element array is mounted on a recess of the Si sub-mount using a flip-chip bonder in completely the same manner as in Example 1 except that VCSEL elements in an array structure are used.

(Mounting of Waveguide Film)

Next, after positioning both ends of the polymer optical waveguide films in the width direction of the same, the films are placed on a predetermined mount surface of the Si sub-mount using the flip-chip bonder so as to align light emitting surfaces of the VCSEL elements with end faces of the waveguide cores and are secured to the sub-mount using the ultraviolet curable resin for the cores.

(Mounting of Light Receiving Elements)

Then, other end faces of the polymer optical waveguide cores on the sub-mount and light receiving surfaces of a back side reception type photo-diode element array are bonded using the flip-chip bonder in completely the same manner as in Example 1 except that photo-diode elements in an array structure are used.

Next, electrodes of the VCSEL element array and the back side reception type photo-diode element array are connected to package electrodes using wire bonding. Further, an IC sealing resin is dispensed to seal each wire with the resin. Thus, the VCSEL elements and the photo-diode elements are electrically connected to predetermined electrode pads to obtain a two-way optical transceiver module having a pair of light transmitting and receiving parts and polymer optical waveguide films.

Example 3

A polymer optical waveguide film is fabricated in the same manner as Example 1, and a sub-mount is thereafter fabricated in completely the same manner as in Example 1 except that the sub-mount is fabricated using an electrical pole made of Ni. Then, a VCSEL element is mounted on the sub-mount made of Ni in completely the same manner as in Example 1, and the two-way waveguide film and a back side reception type photo-diode element are mounted in the order listed on the VCSEL element. Thereafter, electrodes are connected using wire bonding, and resin sealing is provided to complete a two-way optical transceiver module having a pair of light transmitting and receiving parts and a polymer optical waveguide film.

Example 4

A polymer optical waveguide film is fabricated in the same manner as Example 1, and electrode pads are thereafter formed on surfaces of the two-way polymer optical waveguide cut by a dicer by depositing Ti and Au on the surfaces and etching the same. Next, a sub-mount made of Si is fabricated in completely the same manner as in Example 1. Thereafter, a VCSEL element and the two-way waveguide film are mounted in the order listed on the sub-mount made of Si. Then, a photo-diode element is mounted using a flip-chip bonder so as to align a core part of the two-way waveguide film with a light receiving part of the photo-diode element and so as to connect an electrode of the photodiode with an electrode pad formed on the waveguide in advance. Finally, resin sealing is provided to complete a two-way optical transceiver module having a pair of light transmitting and receiving parts and a polymer optical waveguide film.

The invention is not limited to the exemplary embodiments, examples and illustrations described above, and various design changes may be made without departing from the spirit of the invention.

The invention provides a flexible optical waveguide film which can be fabricated with a minimum size to allow a low profile and compactness to be achieved and which increases freedom in wiring, an optical transceiver module, and a multi-channel optical transceiver module. The invention also provides a method of manufacturing a flexible optical waveguide film that facilitates and simplifies manufacturing steps.

What is claimed is:

1. A multi-channel optical transceiver module for optical transmission and reception, comprising:
    two or more optical waveguide films, each flexible optical waveguide film including:
    two waveguide cores, each of the two waveguide cores having a first core, a second core and an optical converting part and capable of converting a path of an optical signal from one of the first and second cores toward the other one of the first and second cores within the flexible optical waveguide film;
    a clad surrounding the two waveguide cores;
    an air void located inside the waveguide film; and
    two interfaces defining the air void,
    wherein each of the two interfaces is disposed at the optical converting part of each of the two waveguide cores and converting the path of the optical signal, and
    the two or more flexible optical waveguide films are formed one over another in a direction substantially perpendicular to the path of the optical signal.

2. The multi-channel optical transceiver module for optical transmission and reception according to claim 1,
    wherein the clad comprises an alicyclic olefin resin having a norbornene structure as a principal chain thereof and a polar group as a side chain thereof.

3. The multi-channel optical transceiver module for optical transmission and reception according to claim 1, further comprising:
    a light emitting element provided at one of the light entrance/exit end faces; and
    a light receiving element provided at the other one of the light entrance/exit end faces.

4. The multi-channel optical transceiver module for optical transmission and reception according to claim 3,
    wherein the light entrance/exit end faces are cut surfaces of the flexible optical waveguide film.

5. The multi-channel optical transceiver module for optical transmission and reception according to claim 1, wherein the light emitting element and the light receiving element are secured with the same resin as a resin from which the waveguide cores is formed.

6. A multi-channel optical transceiver module according to claim 1,
    wherein the light transmitting parts of the flexible optical waveguide films are formed by a light emitting element array, and
    the light receiving parts of the flexible optical waveguide films are formed by a light receiving element array.

7. A multi-channel optical transceiver module according to claim 1,
    wherein the light transmitting part comprises a VCSEL element, and the light receiving part comprises a photo-diode element.

8. A method of manufacturing a flexible optical waveguide film having an optical path converting function, the method comprising:
    preparing a mold having a concave part and a convex part, the mold having two or more through holes in communication with one and the other end of the concave part, the concave part corresponding to a convex part of two waveguide cores that are provided independently, the waveguide cores being capable of propagating two different optical signals and converting a path of each optical signal, within the flexible optical waveguide film, the convex part being provided in a midway of the concave part, the convex part in which an air void having an interface is formed, the interface converting the path of each optical signal;
    bonding a film substrate for a bottom clad with the mold;
    dispensing a curable resin for core formation in the through hole at one end of the concave part of the mold having the film substrate for the bottom clad bonded thereon and performing pressure-reducing evacuation at the through hole on the other end of the concave part of the mold to fill the concave part of the mold with the curable resin for core formation;
    curing the curable resin for core formation that fills the concave part;
    releasing the mold from the film substrate for the bottom clad;
    combining a film substrate for a top clad with the film substrate for the bottom clad having the waveguide core part and the mirror part formed thereon using a curable resin for cladding;
    curing the layer of the curable resin for cladding; and
    stacking the two or more flexible optical waveguide films one over another in a direction substantially perpendicular to the paths of the optical signals.

9. A method of manufacturing a flexible optical waveguide film according to claim 8, the film substrate for the bottom clad and the film substrate for the top clad comprise an alicyclic olefin resin having a norbornene structure as a principal chain thereof and a polar group as a side chain thereof.

10. A method of manufacturing a flexible optical waveguide film according to claim 8,
    wherein a silicone resin is used for the mold.

11. A method of manufacturing a flexible optical waveguide film according to claim 8,
    wherein the mirror part is formed by reducing the pressure in the air void.

12. A method of manufacturing a flexible optical waveguide film according to claim 8, wherein the air void is formed by performing the combining step under a low pressure to control an amount of the curable resin for cladding used for combining such that a bonding layer obtained.

13. The multi-channel optical transceiver module for optical transmission and reception according to claim 1,
    wherein the second core of one of the two waveguide cores stretches from an upper face of the optical waveguide film to the air void, the second core of the other waveguide core stretches from a lower face of the optical waveguide film to the air void and the first cores of the two waveguide cores stretch in substantially the same direction.

14. The multi-channel optical transceiver module for optical transmission and reception according to claim 13, further comprising:

a light emitting device array that irradiates optical signals to each of the second cores of one group of the second cores of the two or more flexible optical waveguide films, the second cores belonging to the one group of the second cores stretching from the upper face or the lower face of the optical waveguide film; and a light receiving device array that receives optical signals from each of the second cores of the other group of the second cores.

* * * * *